Oct. 18, 1960      S. R. RICH      2,956,789

MECHANICAL VIBRATOR SYSTEM

Filed April 19, 1957

INVENTOR.
STANLEY R. RICH

BY

ATTORNEY

United States Patent Office 2,956,789
Patented Oct. 18, 1960

2,956,789

MECHANICAL VIBRATOR SYSTEM

Stanley R. Rich, West Hartford, Conn., assignor to The General Ultrasonics Company, a corporation of Connecticut Filed Apr. 19, 1957, Ser. No. 653,945

7 Claims. (Cl. 259—72)

This invention relates to mechanical vibrators, and more particularly to combinations of such vibrators with diaphragms.

In many systems employing mechanical vibrators, it is desirable to combine one or more vibrators with a diaphragm or wall through which elastic wave vibrations are to be passed. Thus, for example, electro-mechanical vibrators enclosed in housings to protect them from liquids in which they are immersed are advantageously mounted on a wall of the housing, and the supporting wall is used as a diaphragm. In some systems a tank to hold liquid baths which it is desired to irradiate with compressional wave energy will have one or more vibrators affixed to one if its walls or its bottom, on the outside, in which case the wall or the bottom functions as a diaphragm for elastic waves. It is the object of this invention to provide arrangements for affixing vibrators to diaphragms in a fashion which will assure highly efficient transfer of energy through the diaphragm.

One of the most convenient types of vibrator used for interchanging compressional wave energy with liquids is the longitudinal vibrator. A face of the vibrator which moves to and from the liquid is used, and this face is held against or affixed to the diaphragm. As a coupling, it is usual to employ a cement between this face and the diaphragm. The cement is preferably a good transmitter of elastic waves. Epoxy cements are suitable for this purpose. However, while such cements have great shear resistance, their peel strength is not able to prevent separation from the diaphragm or the vibrator, as may occur when high levels of elastic wave energy are being interchanged or under certain conditions of mechanical shock. Heretofore it has been the practice to carry the cement part way up the side walls of the vibrator about the periphery of the face adjacent the diaphragm, and to carry the cement along the diaphragm for some distance away from the vibrator face, in order to prevent peeling of the cement. I have found that this practice results in a loss of energy, which is readily demonstrated with impedance measuring equipment. According to my invention, this loss is prevented, and an improved mounting arrangement is provided. This is done by providing a mounting arrangement in which rigid elements pass from the diaphragm into the vibrator through the vibrator face adjacent the diaphragm, and hold the vibrator to the diaphragm. From another point of view, my invention provides a new method of employing cement so that it is under shear stress in two directions, one of which is such that it prevents peeling of the cement from the diaphragm or the confronting diaphragm face.

Further advantages and features of the invention will appear from the description of certain embodiments thereof which follows. The description refers to the attached drawing, wherein.

Figure 1:
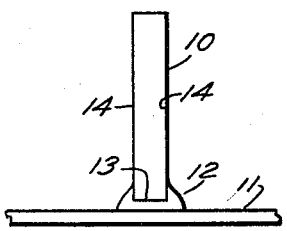
Fig. 1 illustrates generally a known prior method of mounting a vibrator on a diaphragm.

Referring now to Fig. 1, a longitudinal vibrator 10 is affixed to a diaphragm 11 by means of cement 12. The vibrator can provide elastic wave energy to the diaphragm through the confronting end face 13. This is a usual arrangement for providing compressional wave energy to a liquid (not shown) which may be located on the opposite side of the diaphragm. To prevent the cement 12 from peeling from the face 13 or the diaphragm 11, the cement is carried a short way up the side wall 14 of the vibrator. This extra cement is placed under shear stress by forces which tend to cause such peeling, and aids somewhat in preventing separation of the vibrator and the diaphragm. However, by touching the side walls 14, this extra cement binds the vibrator, and absorbs elastic wave energy from the vibrator, thereby limiting the efficiency of energy transfer. With as little as one-eighth inch of side binding, this energy loss can be as much as 50%, as measured by motional impedance loop max.-min. ratios with and without side binding, under identical operating conditions. In addition, this extra cement is not placed under shear stress with respect to the diaphragm, and is therefore not a completely satisfactory mechanical solution to the problem.

Figure 2:
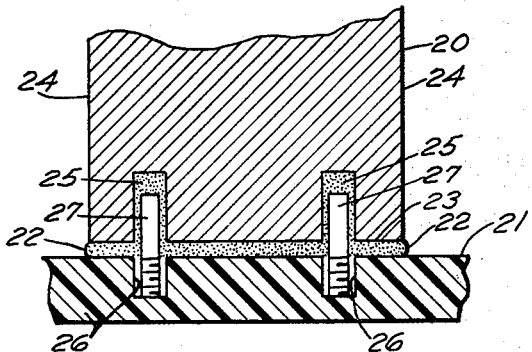
Fig. 2 is a fragmentary cross-section showing a mounting arrangement according to one embodiment of my invention.

Referring now to Fig. 2, the end portion of a vibrator 20, shown in section, has its face 23 confronting a diaphragm 21. The diaphragm is here shown as a plastic sheet, such as acrylic plastic, but it will be appreciated that other materials, such as various metals or glass may be used. Two holes 25, 25 are shown bored through the end face 23 into the body of the vibrator. Two confronting holes 26, 26 are provided in the diaphragm; these holes do not pass through the diaphragm. Two studs 27, 27 are mounted one in each hole 26, 26, as by screw threads. Cement 22 fills the space between the face 23 and the diaphragm 21, and between the studs 27, 27 and the confronting interior side walls of the holes 25, 25 bored in the vibrator 20. The cement 22 does not touch the side walls 24 of the vibrator.

My invention has numerous advantages. No energy is absorbed by contact with the side walls of the vibrator. Forces tending to peel the cement from the face of the vibrator also place the cement under shear stress, which it is well able to resist. The stud being firmly mechanically affixed to the diaphragm, there is no danger that these forces will peel the cement from the diaphragm. Since the diaphragm is not pierced, there is no danger of liquid leaks.

Figure 3:
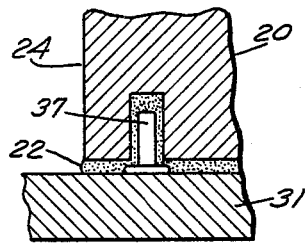
Fig. 3 is a fragmentary cross-section showing a second embodiment of my invention.

Fig. 3 shows the vibrator 20 adjacent a metal diaphragm 31 to which a stud 37 has been affixed, as by soldering or welding. The cement 22 functions as described in connection with Fig. 2. This embodiment has the same advantages as that of Fig. 2.

Figure 4:
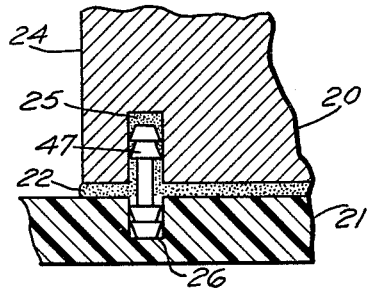
Fig. 4 is a fragmentary cross-section showing a third embodiment of my invention.

Fig. 4 shows the vibrator 20 held adjacent the diaphragm 21 of Fig. 2 by a pin 47 which has barbs at its ends. These barbs are so directed that they retain the pin 47 in each of the holes 25 and 26. With pins like pin 47 the vibrator 20 may be pushed against the diaphragm 21, compressing the cement between the two, and forcing it into the holes 25 and 26. The cement 22 in this embodiment provides shear-force retention in both the diaphragm and the vibrator.

Figure 5:
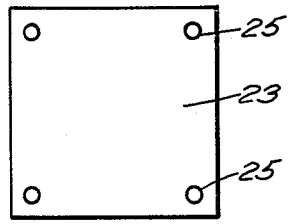
Fig. 5 is a plan view of a rectangular-faced vibrator showing a preferred location for mounting devices such as those shown in Figs. 2, 3, and 4.

Fig 5 shows the location of the mounting holes 25 in in the face 23 of the vibrator 20. In a rectangular face, it is suitable to provide four holes 25, located one near each corner. Of course, mating holes and/or studs are provided in or on the associated diaphragm.

Figure 6:
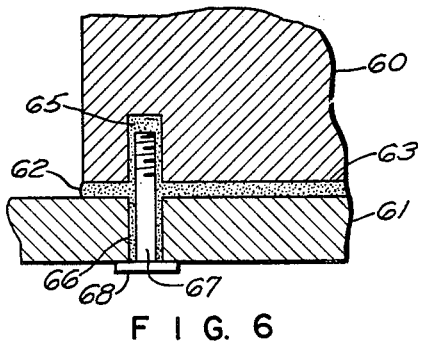
Fig. 6 is a fragmentary section showing a fourth embodiment of my invention.

Fig. 6 illustrates a mounting arrangement in which a vibrator 60 has a hole 65 which receives a threaded bolt 67 which pierces the diaphragm 61. The bolt has a head 68 which is larger than the hole 66 which pierces the diaphragm 61. The bolt 67 is tightened to draw the face 63 of the vibrator close to the diaphragm 61, compressing the cement 62, which flows into the holes 66 and 65. While it is possible with this embodiment to dispense with cement for mechanical purposes, I prefer to use it for its acoustical and leak sealing properties.

Other embodiments of my invention will occur to those skilled in the art. The claims which follow are accordingly not intended to be limited to the details of the illustrated embodiments, but only by the prior art.

What I claim is:

1. In combination, a longitudinal vibrator having an end surface through which to pass elastic waves and side walls meeting said surface at its periphery, a diaphragm adjacent said surface and extending beyond said periphery, a mounting element projecting from said diaphragm passing from said diaphragm into said vibrator through a bore in said vibrator opening through said surface, and cement which is able to resist shear stress between said surface and said diaphragm and between said element and interior portions of said bore.

2. In combination, a longitudinal vibrator having an end surface through which to past elastic waves and side walls meeting said surface at its periphery, a diaphragm adjacent said surface and extending beyond said periphery, a mounting element projecting from said diaphragm passing from said diaphragm into said vibrator through a bore in said vibrator opening through said surface, and cement which is able to resist shear stress between said surface and said diaphragm and between said element and interior portions of said bore, said side walls being substantially untouched by said cement.

3. In combination, a longitudinal vibrator having an end surface through which to pass elastic waves and side walls meeting said surface at its periphery, a diaphragm adjacent said surface, a mounting element projecting from said diaphragm passing from said diaphragm into said vibrator through a bore in said vibrator opening through said surface in a direction which is substantially normal to said surface, and a high shear strength cement between said surface and said diaphragm and between said element and interior portions of said bore.

4. In combination, a longitudinal vibrator having an end surface through which to pass elastic waves and side walls meeting said surface at its periphery, a diaphragm adjacent said surface, a bore in said vibrator opening only through said surface, a projection mounted on and extending from the confronting surface of said diaphragm into said bore, and cement which is able to resist shear stress between said surface and said diaphragm, and between said projection and the inner walls of said bore.

5. In combination, a longitudinal vibrator having an end surface through which to pass elastic waves and side walls meeting said surface at its periphery, a diaphragm adjacent said surface, a plurality of bores in said vibrator opening only through said surface, the bore openings being arrayed about said surface near its periphery, a plurality of studs mounted on and projecting from said diaphragm passing from said diaphragm into said bores, and cement which is able to resist shear stress between said surface and said diaphragm and between each stud and the inner walls of the bore in which it is located.

6. In combination, a longitudinal vibrator having an end surface, a metal diaphragm having one side confronting said surface, a metal stud welded to said side of said diaphragm, said stud passing from said diaphragm into said vibrator through a bore in said vibrator opening through said surface for holding said diaphragm and vibrator together and cement which is able to resist shear stress between said surface and said diaphragm, and between said stud and the inner side wall of said bore.

7. In combination, a longitudinal vibrator having an end surface, a metal diaphragm having one side confronting said surface, a stud affixed to said side of said diaphragm, said stud passing from said diaphragm into a bore in said vibrator opening through said surface, and cement which is able to resist shear stress between said surface and said diaphragm, and between said stud and the inner side wall of said bore.

References Cited in the file of this patent

UNITED STATES PATENTS

| | | |
|---|---|---|
| 713,334 | Neihaus | Nov. 11, 1902 |
| 837,767 | Aims | Dec. 4, 1906 |
| 1,101,858 | Lachman | June 30, 1914 |
| 1,380,869 | Fay | June 7, 1921 |
| 2,009,724 | Bircher | July 30, 1935 |
| 2,105,479 | Hayes | Jan. 18, 1938 |
| 2,414,495 | Vang | Jan. 21, 1947 |
| 2,435,031 | Burns | Jan. 27, 1948 |
| 2,450,412 | Benioff | Oct. 5, 1948 |
| 2,724,393 | Heise | Nov. 22, 1955 |
| 2,826,396 | Murdoch | Mar. 11, 1958 |
| 2,854,795 | McCown et al. | Oct. 7, 1958 |